United States Patent
Brenner et al.

(10) Patent No.: US 10,087,349 B2
(45) Date of Patent: Oct. 2, 2018

(54) TWO-COMPONENT POLYURETHANE HOT-MELT ADHESIVE WITH HIGH INITIAL AND FINAL STRENGTH

(71) Applicant: Evonik Degussa GmbH, Essen (DE)

(72) Inventors: Gabriele Brenner, Dülmen (DE); Birgit Drees, Herne (DE); Christina Cron, Velbert (DE); Kerstin Fuchs, Marl (DE)

(73) Assignee: Evonik Degussa GmbH, Essen (DE)

( * ) Notice: Subject to any disclaimer, the term of this patent is extended or adjusted under 35 U.S.C. 154(b) by 81 days.

(21) Appl. No.: 15/502,817

(22) PCT Filed: Aug. 17, 2015

(86) PCT No.: PCT/EP2015/068818
§ 371 (c)(1),
(2) Date: Feb. 9, 2017

(87) PCT Pub. No.: WO2016/034394
PCT Pub. Date: Mar. 10, 2016

(65) Prior Publication Data
US 2017/0233622 A1    Aug. 17, 2017

(30) Foreign Application Priority Data
Sep. 5, 2014    (DE) .................. 10 2014 217 783

(51) Int. Cl.
| | | |
|---|---|---|
| C09J 175/06 | (2006.01) | |
| C08G 18/76 | (2006.01) | |
| C08G 18/12 | (2006.01) | |
| C08G 18/42 | (2006.01) | |

(52) U.S. Cl.
CPC ............ C09J 175/06 (2013.01); C08G 18/12 (2013.01); C08G 18/4202 (2013.01); C08G 18/4216 (2013.01); C08G 18/4238 (2013.01); C08G 18/7671 (2013.01); C08G 2170/20 (2013.01)

(58) Field of Classification Search
CPC .... C08G 18/10; C08G 18/12; C08G 18/6529; C08G 18/6685; C09J 175/00; C09J 175/04; C09J 175/06; C09J 175/08; C09J 175/10; C09J 175/12; C09J 175/14; C09J 175/16
See application file for complete search history.

(56) References Cited

U.S. PATENT DOCUMENTS

| | | | | |
|---|---|---|---|---|
| 5,310,766 | A * | 5/1994 | Baumann ........... | C08G 18/4009 521/117 |
| 5,441,808 | A * | 8/1995 | Anderson ............ | C08G 18/10 428/349 |
| 5,599,895 | A * | 2/1997 | Heider ................. | C08G 18/12 528/59 |
| 5,932,680 | A | 8/1999 | Heider | |
| 5,998,538 | A * | 12/1999 | Meckel ................. | C08G 18/10 524/539 |
| 6,136,136 | A | 10/2000 | Heider | |
| 6,387,449 | B1 * | 5/2002 | Reid ..................... | C08G 18/12 427/385.5 |
| 6,423,810 | B1 * | 7/2002 | Huang .................. | C08G 18/10 525/131 |
| 7,931,970 | B2 | 4/2011 | Schlongloff et al. | |
| 9,193,895 | B2 | 11/2015 | Pind et al. | |
| 2015/0203728 | A1 | 7/2015 | Burkhardt et al. | |
| 2015/0240139 | A1 | 8/2015 | Kelch et al. | |

FOREIGN PATENT DOCUMENTS

| | | |
|---|---|---|
| DE | 102007062529 A1 | 6/2009 |
| EP | 0590398 A1 | 4/1994 |
| EP | 2655466 A1 | 10/2013 |
| EP | 2700666 A1 | 2/2014 |
| EP | 2706075 A1 | 3/2014 |
| WO | 8901503 A1 | 2/1989 |
| WO | 9115530 A1 | 10/1991 |
| WO | 9412552 A1 | 6/1994 |
| WO | 02083807 A1 | 10/2002 |
| WO | 2009015149 A1 | 1/2009 |
| WO | 2012084937 A1 | 6/2012 |

OTHER PUBLICATIONS

German language International Search Report dated Dec. 3, 2015 in PCT/EP2015/068818 (4 pages).
German language Written Opinion dated Dec. 3, 2015 in PCT/EP2015/068818 (7 pages).
International Search Report dated Dec. 3, 2015 in PCT/EP2015/068818 (3 pages).

* cited by examiner

*Primary Examiner* — Christopher M Rodd
(74) *Attorney, Agent, or Firm* — Nexsen Pruet, LLC; Philip P. McCann

(57) ABSTRACT

A two-pack polyurethane adhesive for semi-structural and structural adhesive bonds which are applied in melt form and have a high handling strength wherein the two-pack polyurethane adhesive includes a first pack A containing at least one polyester A1 which is solid at room temperature and at least one polyol A2 having a hydroxyl group functionality greater than 2.0, and a second pack B containing polyurethane prepolymers having isocyanate groups.

20 Claims, No Drawings

TWO-COMPONENT POLYURETHANE HOT-MELT ADHESIVE WITH HIGH INITIAL AND FINAL STRENGTH

This application is a national stage application under 35 U.S.C. § 371 of International Application No. PCT/EP2015/068818 filed 17 Aug. 2015, which claims priority to German Application No. 102014217783.9 filed 5 Sep. 2014, the disclosures of which are expressly incorporated herein by reference.

FIELD

The present invention relates to two-pack polyurethane adhesives for semi-structural and structural adhesive bonds which are applied in melt form and have a high handling strength.

BACKGROUND

Structural two-pack polyurethane adhesives composed of polyols and polyisocyanates have been state of the art for a long period. They cure rapidly after mixing and can therefore absorb and transmit forces after only a short time. Structural adhesives, also called construction adhesives or assembly adhesives, are used in the manufacturing industry to bond components to one another in such a way that the adhesive bond is part of a permanently durable construction. Adhesives of this kind are typically tough and elastic and have to meet high demands in relation to processibility, strength and adhesion forces.

The prior art discloses polyurethane adhesives formed from polyols and polyisocyanates, in which both the polyol pack and the polyisocyanate pack are liquid at room temperature, meaning that the glass transition temperatures and possibly melting points are below 23° C. For example, applications DE 102007062529 and EP 2655466 describe liquid polyurethane adhesives composed of at least one higher-functionality polyol pack. In this way, high final strengths are said to be achievable with simultaneously high elongation. These properties are necessary, for example, for the bonding of wind turbine half-shells.

Applications WO2009/015149, EP 2706075 and EP 2700666 likewise describe liquid two-pack polyurethane adhesives. As well as good metal and plastic adhesion, these structural adhesives are said to have a homogeneous modulus of elasticity over a broad temperature range and be suitable for bonds in the automotive sector.

The disadvantage of the above-described systems is comparatively low handling strength directly after the substrates have been joined. However, a high initial or handling strength is necessary to enable high cycle rates in production. For sufficient handling strength, a tensile shear strength of at least 0.3 MPa is required before the fixed components can be separated (A. Lutz, S. Schmatloch, "Strukturelles Verkleben von Faserverbundwerkstoffen im Fahrzeugbau" [Structural bonding of fiber composite materials in motor vehicle construction], lightweight design, March 2014).

In the case of the liquid two-pack polyurethane systems of the prior art, the cohesion of the adhesive bond arises only through chemical crosslinking of the polyol pack with the polyisocyanate pack and is therefore linked to the progress of the reaction. Therefore, the adhesive bonds cannot yet be subjected to mechanical stress directly after application and the substrates can move with respect to one another. Typical curing times before attainment of handling strength are 40 minutes to 6 hours (cf. A. Lutz, S. Schmatloch, "Strukturelles Verkleben von Faserverbundwerkstoffen im Fahrzeugbau", lightweight design, March 2014).

The addition of catalysts can accelerate the curing; as well as the known tin-containing systems, for example, EP 2706075 describes a metal chelate complex which enables rapid and blister-free curing. However, the crosslinking and hence the handling strength are highly dependent on the choice of catalyst and the correct dosage.

In order to enable rapid further processing, the bonds with two-pack adhesives that are liquid at room temperature are additionally subjected to full-area or point precuring with the aid of thermal methods, for example by infrared heating or induction, at temperatures between about 60 and 120° C. The disadvantage of this process lies in an additional processing step.

SUMMARY

The problem addressed by the present invention is therefore that of providing an improved two-pack (semi)structural adhesive.

Surprisingly, it has been shown in the context of the present invention that formulations according to the present invention solve this complex problem. In contrast to the prior art, the formulation of the invention contains constituents that are not exclusively liquid but also solid at room temperature in one or both packs. This means that at least one constituent has a melting point and/or a glass transition point exceeding 23° C.

The adhesives of the present invention, as well as high final strength and elongation, have good handling strength after joining. In the context of the present invention, handling strength means the necessary adhesive strength to be able to send bonded substrates to a further processing operation without further mechanical fixing. In addition, after application, it is possible to dispense with the use of catalysts or thermal preliminary reactions. In this way, it is possible to achieve short cycle times during the joining operation and to minimize proneness to errors in the dosage operation.

DETAILED DESCRIPTION

The present invention firstly provides two-pack polyurethane adhesives comprising a first pack A containing at least one polyester A1 which is solid at room temperature and at least one polyol A2 having a hydroxyl group functionality greater than 2.0 and optionally additives, and a second pack B containing polyurethane prepolymers having isocyanate groups and optionally additives.

The A pack of the polyurethane adhesives consists of a mixture of a polyester A1 which is solid at room temperature and at least one polyol A2 having a hydroxyl group functionality greater than 2.0.

The polyesters A1 used in accordance with the invention are solid at room temperature, meaning that the glass transition temperature and/or the melting point of A1 is/are above room temperature, 23° C. The polyesters A1 may be either amorphous or crystalline. The glass transition point and the melting point are determined by the DSC method to DIN 53765.

The polyesters A1 can be prepared by polycondensation of di- or polyols and di- or polycarboxylic acids or derivatives thereof. With regard to the monomers used in the synthesis of the polyesters, there are no restrictions in principle. Preferably, the polyester A1 is based on di- or polycarboxylic acids selected from succinic acid, adipic acid, sebacic acid, dodecanedioic acid, terephthalic acid, isophthalic acid, phthalic acid and hexahydrophthalic acid, and on di- or polyols selected from ethylene glycol, neopentyl glycol, neopentyl glycol hydroxypivalate, butane-1,4-diol, butyl ethylbutanediol, cyclohexanedimethanol and hexane-1,6-diol.

In the context of the present invention, di- or polycarboxylic acids or derivatives thereof are especially understood to mean the acids and anhydrides thereof.

Polyesters having a glass transition point above 23° C. are preferably obtained from aromatic di- or polycarboxylic acids such as terephthalic acid and isophthalic acid; in relation to the diol, there are no preferred monomers. Polyesters having a melting point above 23° C. are preferably obtained from linear aliphatic di- or polycarboxylic acids such as succinic acid, adipic acid, sebacic acid and dodecanedioic acid or terephthalic acid and linear aliphatic diols such as butane-1,4-diol and hexane-1,6-diol.

It is also possible to use polycarboxylic acids and polyols having higher functionalities. In the context of the present invention, it is possible to use mixtures of different polyesters A1.

The polyesters A1 preferably have a functionality of at least one hydroxyl end group. Preferably, the polyesters A1 have a functionality between 1.0 and 3.0; particular preference is given to hydroxyl functionalities of 2.0.

The hydroxyl functionality of the polyester is controlled by the functionalities of the di- or polyols and di- or polycarboxylic acids used.

The number-average molecular weight of the polyesters A1 is 100-10 000 g/mol, preferably 1000-5000 g/mol. It is determined to DIN 55672-1 by means of gel permeation chromatography in tetrahydrofuran as eluent and polystyrene for calibration.

According to the functionality and the molecular weight of the polyols, the concentration of hydroxyl end groups is between 10 and 500 mg KOH/g, preferably between 20 and 50 mg KOH/g, determined by titrimetric means to DIN 53240-2. The concentration of acid end groups determined to DIN EN ISO 2114 is below 2 mg KOH/g, preferably below 1 mg KOH/g.

The polyol A2 may be amorphous or crystalline, and solid or liquid at room temperature. The polyol A2 may also be a mixture of different polyols; what is essential is that at least one polyol in the mixture A2 has a hydroxyl group functionality of greater than 2.0.

The polyol A2 or polyol mixture A2 used in accordance with the invention has a functionality of more than two hydroxyl end groups. Preference is given to functionalities between 2.1 and 5; more preferably, the hydroxyl group functionality of the polyol A2 is 3.0.

The polyol or polyol mixture A2 of the invention may be any known polyol, for example polyethers, polyacrylates, polycarbonates or hydroxyl-terminated polyolefins or polyesters.

In the case of polyethers, preference is given to polyethylene glycols, polypropylene glycols, polytetrahydrofuran or copolymers thereof.

In the case of polyacrylates, preference is given to polyacrylates which have at least one hydroxyl functionality and obtainable by free-radical polymerization of acrylates or methacrylates, for example methyl methacrylate, butyl methacrylate, hydroxyethyl acrylate or hydroxyethyl methacrylate.

In the case of polycarbonates, preference is given to reaction products of dialkyl or diaryl carbonates, such as dimethyl carbonate or diphenyl carbonate, and linear aliphatic diols, for example pentane-1,5-diol or hexane-1,6-diol.

In the case of hydroxyl-terminated polyolefins, preference is given to polybutadienes which are prepared via a free-radical polymerization of butadiene with hydrogen peroxide as initiator.

Preferably, the polyol A2 is a polyester or a mixture of polyesters, which are prepared by polycondensation of di- or polyols and di- or polycarboxylic acids or derivatives thereof. Particularly preferred monomers are the dicarboxylic acids adipic acid, isophthalic acid and terephthalic acid, and also, as trifunctional carboxylic acid, trimellitic anhydride. Particularly suitable polyols are ethylene glycol, neopentyl glycol, hexane-1,6-diol and trimethylolpropane. The monomers may also be any other known di- or polycarboxylic acids and di- or polyols.

The hydroxyl group functionality of the polyester is calculated from the functionalities of the monomers used. In order to achieve a hydroxyl group functionality of the polyester of greater than 2.0, the mean functionality of the di- or polyols has to exceed the mean functionality of the di- or polycarboxylic acids. This is achieved, for example, when exclusively dicarboxylic acids but a mixture of bi- and trifunctional polyols are used as monomers.

The number-average molecular weight of the polyol A2 or the constituents of the polyol mixture is 100-10 000 g/mol, preferably 500-3000 g/mol, determined to DIN 55672-1 by means of gel permeation chromatography in tetrahydrofuran as eluent and polystyrene for calibration. According to the functionality and the molecular weight of the polyols, the concentration of hydroxyl end groups is between 10 and 500 mg KOH/g, preferably between 50 and 150 mg KOH/g, determined by titrimetric means to DIN 53240-2.

The concentration of acid end groups determined to DIN EN ISO 2114 is below 5 mg KOH/g, preferably below 2 mg KOH/g and more preferably below 1 mg KOH/g.

In relation to glass transition temperature and melting point, there are no restrictions for polyol A2 or for the polyols used in the mixtures, meaning that the polyol A2 or the polyols may be solid or liquid.

The weight ratio between polyester A1 and polyol A2 is between 1:9 and 9:1, preferably between 1:5 and 5:1 and most preferably between 1:2 and 2:1.

The second pack B of the two-pack polyurethane adhesive of the invention comprises polyurethane prepolymers having isocyanate groups. The latter especially consist of the reaction product of at least one polyol with an excess of polyisocyanates. Preference is given to using a mixture of different polyols.

The polyol or polyol mixture of pack B according to the invention may be any known polyol, for example polyethers, polyacrylates, polycarbonates, hydroxyl-terminated polyolefins or polyesters.

Preference is given to using polyesters or mixtures of polyesters as polyols for preparation of pack B. The polyesters used are prepared by polycondensation of di- or polyols and di- or polycarboxylic acids or derivatives thereof. Particularly preferred monomers are the dicarboxylic acids adipic acid, isophthalic acid and terephthalic acid, and also, as trifunctional carboxylic acid, trimellitic anhydride. Particularly suitable polyols are ethylene glycol, neopentyl glycol, neopentyl glycol hydroxypivalate, hexane-1,6-diol and trimethylolpropane. The monomers may also be any other known and di- or polycarboxylic acids and di- or polyols.

The polyol used in pack B or the constituents of the polyol mixture used have a functionality of at least one hydroxyl end group. Preference is given to functionalities between 1 and 5, more preferably between 2 and 3.

The number-average molecular weight of the polyols used in pack B 1 is 100-20 000 g/mol, preferably 500-5000 g/mol. According to the functionality and the molecular weight of the polyols, the concentration of hydroxyl end groups is between 10 and 500 mg KOH/g, preferably between 20 and 150 mg KOH/g, determined by titrimetric means to DIN 53240-2. The concentration of acid end groups determined to DIN EN ISO 2114 is below 5, preferably below 2 mg KOH/g and more preferably below 1 mg KOH/g. In relation to glass transition temperature and melting point of the polyols used in pack B, there are no restrictions.

The aforementioned polyols or polyol mixtures have to be converted for use as pack B in polyurethane prepolymers having isocyanate groups. For this purpose, the polyol or polyol mixture, depending on the viscosity of the particular formulation, is reacted with an excess of polyisocyanates at temperatures of up to 170° C., preferably between 80 and 130° C. The polyisocyanates used have an isocyanate functionality of at least 2.0.

Polyisocyanates used may be di- or multifunctional, aromatic, aliphatic or cycloaliphatic isocyanates, and carbodiimide-modified isocyanates or isocyanate-terminated prepolymers. Examples of suitable polyisocyanates are diphenylmethane 4,4'-diisocyanate, diphenylmethane 2,4'-diisocyanate, toluene diisocyanate isomers, isophorone diisocyanate, hexamethylene diisocyanate, dicyclohexylmethane 4,4'-diisocyanate and mixtures thereof. Aromatic polyisocyanates are used with particular preference; these are especially preferably diphenylmethane 4,4'-diisocyanate and mixtures of diphenylmethane 4,4'-diisocyanate and diphenylmethane 2,4'-diisocyanate.

The OH:NCO ratio of the polyols, based on all polyols both in pack A and in pack B of the adhesive formulation, to the polyisocyanate used for preparation of pack B is 1:0.8 to 1:3, preferably from 1:1.0 to 1:1.5 and more preferably 1:1.1. In order to avoid side reactions with residual moisture, the polyol or polyol mixture is degassed under reduced pressure prior to reaction with the isocyanate. For the same reasons, pack B also has to be stored under inert conditions.

In addition, it is also additionally possible to use additives in pack B.

Suitable additives for pack A and/or B are, for example, fillers, rheology modifiers, pigments or dyes, nonfunctionalized polymers, flame retardants, tackifiers, waxes, plasticizers, desiccants, adhesion promoters, fibers, latent hardeners, hydrolysis stabilizers, and ageing stabilizers and auxiliaries. It is also possible for catalysts to be present, but these are not absolutely necessary. These may be rheology modifiers such as Aerosil®, nonfunctionalized polymers, for example thermoplastic polyurethanes (TPUs) and/or polyacrylates and/or ethylene-vinyl acetate copolymers (EVA); pigments or fillers, for example talc, silicon dioxide, titanium dioxide, barium sulphate, calcium carbonate, carbon black or color pigments, external flame retardants; tackifiers, for example rosins, hydrocarbon resins, phenol resins, waxes, plasticizers, desiccants, adhesion promoters, fibers, latent hardeners, hydrolysis stabilizers, and ageing stabilizers and auxiliaries. Preference is given to using rheology modifiers, especially lamp black, talc and chalk.

The total proportion of additives in each pack is 0% to 50% by weight, preferably 5% to 30% by weight.

The two packs A and B are stored separately until the two-pack polyurethane adhesive of the invention is used. The two packs can generally be stored at room temperature with exclusion of moisture for several weeks.

The present invention further provides for the use of the two-pack polyurethane adhesives of the invention for production of adhesive bonds.

The two-pack polyurethane adhesive of the invention is applied as a melt at a temperature above room temperature and features a high initial strength and a good final strength with simultaneously high elongation. The adhesive thus meets the demands on adhesive bonds with short cycle times, which enable rapid further processing and simultaneously withstand high mechanical stresses.

The present invention likewise provides methods for producing adhesive bonds based on the two-pack polyurethane adhesives of the invention, comprising the separate melting of the A and B packs, depending on the melt viscosity, at temperatures above the melting points and/or glass transition points of all the constituents in the two packs, preferably at least 70° C., mixing of the two liquid packs A and B and subsequent application to the substrates to be bonded.

After packs A and B have been melted, they are thus mixed in the form of a melt and the resulting adhesive formulation is applied directly to the substrates to be bonded without further storage.

The two liquid packs A and B are mixed with one another in a percentage by volume mixing ratio between 1:3 and 3:1, preferably between 1:2 and 2:1 and more preferably 1:1. The constituents, especially the additives in packs A and B, are chosen such that both packs have similar viscosities and good miscibility. The mixing can be effected by dynamic or static means. Preferably, the two packs are processed from heatable cartridges with the aid of a manual or pneumatic gun and a static mixer. The two packs can also be dispensed into larger containers such as drums or hobbocks and melted prior to processing in suitable melting units, for example with heatable drum melting units, and metered and mixed with pumping systems. Shortly after the packs have been mixed, the hotmelt adhesive is applied to the substrate as a melt and bonded to a second substrate by brief pressing within the open time.

With regard to the use of the two-pack hotmelt adhesive of the invention, there are no restrictions in principle. Of particular suitability are adhesive bonds where sufficient handling strength is to be achieved rapidly, for example in order to enable short cycle times.

The adhesion is adjustable via the polyols used for a broad spectrum of substrates. Possible substrates mentioned by way of example are metals, for example steel or aluminum, plastics, for example polyamide, polycarbonate, polyethylene terephthalate or ABS, especially fiber-reinforced plastics (FRPs) such as carbon fiber- or glass fiber-reinforced polyesters or epoxides (CRP and GFP) and sheet molding compounds (SMCs), and also wood, glass, glass ceramic, concrete, mortar, brick, stone.

The advantage of the application method described using the two-pack polyurethane adhesive of the invention is improved handling strength compared to the prior art through quicker buildup of cohesion. Directly after the application, the cooling of the melt at first results in physical setting through crystallization and/or solidification of the polymers below the melting point and/or glass transition point. Much earlier than chemical crosslinking, the thermoplastic physical setting enables a high handling strength of the adhesive even after a short time and hence rapid further processing of the bonded substrates. Addition of catalysts is therefore not required, since the setting characteristics are controlled via the physical properties of the polyols and polyisocyanates. In a parallel but much slower step, the irreversible chemical curing takes place. This forms a stable polyurethane network which ensures a high final strength.

The application method for a two-pack hotmelt polyurethane adhesive that underlies the present invention is described in WO89/01503. However, the chemical composition of the packs used therein is not specified in detail; in the examples, an epoxy resin having secondary hydroxyl groups is mentioned as polyol pack. More particularly, there is no detailed discussion in the prior art of the functionality of packs used, which is important according to the invention. However, this is crucial for the development of sufficient final strength which meets the demands on a semistructural or structural adhesive. In the context of the present invention, it is shown that a mixture of bifunctional and higher-functionality polyols in pack A allows control of the properties of the adhesive, so as to result in sufficient final strength with simultaneously high elongation. For this purpose, a suitable combination of the individual polyols in the mixture is required: at least one constituent A1 of pack A has to have a glass transition temperature and/or a melting point above room temperature, 23° C., in order to establish sufficient handling strength. In addition, at least one further constituent A2 of pack A has to have a hydroxyl group functionality of greater than two in order to achieve sufficiently high crosslinking density and hence cohesion.

More particularly, the two-pack polyurethane adhesives of the invention are suitable for the (semi)structural bonding of thermally sensitive carbon fiber-reinforced composite materials. The nature and extent of the bonding are unlimited. More particularly, the bonds are bonds in the automotive and transport sector, in the construction industry and in the wood processing industry.

The cured hotmelt adhesive has, at 23° C., a tensile strength of more than 5 MPa, preferably more than 10 MPa, and an elongation at break of more than 100%, preferably of more than 150%. Tensile strength and elongation at break are determined to DIN 53504/DIN EN ISO 527 with a speed of 100 mm/min using a sample of thickness 2 mm which has been conditioned at 20° C. and 65% relative air humidity for 7 days.

The cured hotmelt adhesive has a tensile shear strength at 23° C. of more than 5 MPa, preferably more than 10 MPa, with an adhesive thickness of 2 mm. Tensile shear strength is determined to DIN EN 1465 with a speed of 12 mm/min.

The handling strength of 0.3 MPa is attained after no later than 60 minutes, preferably after no later than 30 minutes and more preferably after no later than 15 minutes. Handling strength means the necessary adhesive strength to be able to send bonded substrates to a further processing operation without further mechanical fixing. Handling strength is determined on the basis of the tensile shear strength according to DIN EN 1465.

Even in the absence of further information it is assumed that a person skilled in the art can make very extensive use of the above description. The preferred embodiments and examples are therefore to be interpreted merely as descriptive disclosure, and certainly not as disclosure that is in any way limiting. The present invention is explained in more detail below with reference to examples. Alternative embodiments of the present invention are obtainable analogously.

Examples

In the context of the examples, the following polyesters are used as polyols:

P1 is a noncrystalline polyester which is solid at room temperature and is formed from C2, C5 and C10 diols and adipic acid, terephthalic acid and isophthalic acid, having an OH number of 50 mg KOH/g.

P2 is a crystalline polyester which is solid at room temperature and is formed from adipic acid and hexanediol, having an OH number of 50 mg KOH/g.

P3 is a polyester which is liquid at room temperature and is formed from C2 and C5 diols and adipic acid, terephthalic acid and isophthalic acid, having an OH number of 100 mg KOH/g.

P4 is a noncrystalline polyester which is solid at room temperature and is formed from C2 and C5 diols, terephthalic acid and isophthalic acid, having an OH number of 70 mg KOH/g.

P5 is a crystalline polyester which is solid at room temperature and is formed from adipic acid and hexanediol, having an OH number of 30 mg KOH/g.

General Preparation Method for the a Pack:

In a flange flask, the amounts of polyesters P1, P2 and P3 specified in Table 1 are melted, homogenized at 130° C. for 30 minutes and dispensed in bubble-free form.

The fillers are incorporated in a Speedmixer (Speedmixer™ DAC 150 from Flack Tek Inc.) with exclusion of air humidity. For this purpose, the polyol mixture is melted, the weights of lamp black, Aerosil and talc specified in Table 1 are added, and the mixture is homogenized at 3000 revolutions/minute at 90° C. for 5 minutes and dispensed into a cartridge. Alternatively, the fillers can be incorporated in a Dispermat. For avoidance of bubbles, the mixture is subsequently degassed briefly.

General Preparation Method for the B Pack:

In a flange flask, the amounts of the dried polyesters P1, P2 and P3 specified in Table 1 are melted at 130° C. Thereafter, the amount of diphenylmethane 4,4'-diisocyanate (MDI) specified in Table 1 is added and the mixture is homogenized rapidly. For complete conversion of the reactants, the mixture is stirred under a protective gas atmosphere at 130° C. for 30 minutes. Subsequently, the isocyanate-containing prepolymer is dispensed into moisture-tight cartridges in bubble-free form.

The fillers are incorporated in a Speedmixer (Speedmixer™ DAAC 150 from Flack Tek Inc.) with exclusion of air humidity. For this purpose, the prepolymer is melted, the weights of talc and chalk specified in the table are added, and the mixture is homogenized at 3000 revolutions/minute at 90° C. for 5 minutes and dispensed into a moisture-tight cartridge. Alternatively, the fillers can be incorporated in a Dispermat. For avoidance of bubbles, the mixture is subsequently degassed briefly.

TABLE 1

Production of the individual packs in a Speedmixer (Example 1) and in a Dispermat (Example 2)

| | OH functionality | $T_g$ [° C.] | $T_m$ [° C.] | OH number [mg KOH/g] | Weight [g] |
|---|---|---|---|---|---|
| A pack | | | | | |
| A1 P1 | 2 | 24 | — | 50 | 12.5 |
| A1 P2 | 2 | −65 | 54 | 50 | 7.5 |
| A2 P3 | 3 | −29 | — | 100 | 40 |
| Flammruβ 101 [1] | | | | | 0.6 |
| Aerosil ® R 202 [2] | | | | | 1.2 |
| Finntalc M 15 [3] | | | | | 6.0 |
| B pack | | | | | |
| B1 P1 | 2 | 25 | — | 50 | 12.5 |
| B1 P2 | 2 | −65 | 54 | 50 | 17.5 |

TABLE 1-continued

Production of the individual packs in a Speedmixer (Example 1) and in a Dispermat (Example 2)

| | OH functionality | $T_g$ [° C.] | $T_m$ [° C.] | OH number [mg KOH/g] | Weight [g] |
|---|---|---|---|---|---|
| B2 P3 | 3 | −30 | — | 100 | 10 |
| 4,4'-MDI [4] | | | | | 18.4 |
| Finntalc M 15 [3] | | | | | 5.8 |
| Omyabond 520-OM chalk [6] | | | | | 23.6 |

[1] carbon black from Orion Engineered Carbons
[2] silica-based thixotropic agent from Evonik Industries AG
[3] magnesium silicate from Mondo Minerals
[4] diphenylmethane 4,4'-diisocyanate, e.g. Lupranat ME from BASF
[5] calcium carbonate from Omya AG

TABLE 2

Production of the individual packs in a Speedmixer (Example 3) and in a Dispermat (Example 4)

| | OH functionality | $T_g$ [° C.] | $T_m$ [° C.] | OH number [mg KOH/g] | Mass [g] |
|---|---|---|---|---|---|
| A pack | | | | | |
| A1 P4 | 2 | 20 | — | 70 | 10 |
| A1 P5 | 2 | −60 | 55 | 30 | 9 |
| A2 P3 | 3 | −29 | — | 100 | 40 |
| Flammruss 101 lamp black | | | | | 0.6 |
| Aerosil R 202 | | | | | 1.2 |
| Finntalc M 15 | | | | | 5.9 |
| B pack | | | | | |
| B1 P4 | 2 | 20 | — | 70 | 10 |
| B1 P5 | 2 | −60 | 55 | 30 | 21 |
| B2 P3 | 3 | −30 | — | 100 | 10 |
| 4,4'-MIDI | | | | | 17.9 |
| Finntalc M 15 | | | | | 5.9 |
| Omyabond 520-OM chalk | | | | | 23.4 |

Use of the Two-Pack Polyurethane Adhesives with Use of a Static Mixer

The two packs A and B are each stored separately from one another and melted at 90° C. prior to use. The two cartridges are of equal size in order to establish a mixing ratio of 1:1. The cartridges which have been heated to 90° C. are assembled, a static mixer (Sulzer MCH 13-24) which has likewise been heated to 90° C. is screwed on and they are inserted into a cartridge gun. The pressure applied in the cartridge gun causes the individual packs to be forced through the static mixer and mixed as a result of the operation of the gun trigger. In order to assure complete mixing of the two packs, the first strand of the length of the static mixer discharged is discarded. The adhesive thus mixed is applied to the substrates to be bonded within the open time and characterized. The adhesive join of the uncured adhesive is 2 mm. The resultant adhesive properties are summarized in Table 3.

TABLE 3

Adhesive properties

| | Example 1 | Example 2 | Example 3 | Example 4 |
|---|---|---|---|---|
| Open time [s] | 510 | 590 | 200 | 210 |
| Setting time [s] | 480 | 450 | 180 | 180 |
| Handling strength [min] | 30 | 30 | 10 | 10 |

TABLE 3-continued

Adhesive properties

| | Example 1 | Example 2 | Example 3 | Example 4 |
|---|---|---|---|---|
| Tensile strength [N/mm²] | 15 | 12 | 19 | 16 |
| Elongation at break [%] | 240 | 200 | 190 | 170 |
| Tensile shear strength PC [MPa] | 10 | 10 | 10 | 9 |
| Tensile shear strength CFP [MPa] | 11 | 9 | 12 | 10 |

To determine the open time, paper strips are pressed onto the adhesive bead at time intervals of 30 seconds. As soon as the surface of the adhesive bead is tack-free, the paper strips are pulled off. The open time corresponds to the time interval within which the paper strip can be removed without fibers tearing out.

The setting time is understood to mean the time which is required for two wood substrates bonded in a T shape, having a length of 100 mm, a width of 20 mm and a thickness of 5 mm, to achieve such a strength that they cannot be separated again by a load of 2 kg. The bonded area is 400 mm².

To produce the bond, the adhesive is applied with a layer thickness of 2 mm to the area of the first substrate to be bonded and bonded to the other substrate in the shape of a "T". The long limb is then subjected to a load of 2 kg at time intervals of 30 seconds.

The setting time reported is the time of suspension of the weight where the bond withstands the load.

To determine tensile strength and elongation at break, a film of thickness 2 mm is produced from the adhesive composition. After a storage time of 7 days at 20° C. and 65% relative humidity, dumbbell-shaped samples having a length of 80 mm, a bar length of 30 mm and a bar width of 4 mm according to DIN EN 53504 are cut out with a die, and the ultimate tensile strength is determined with a tensile tester at 23+/−2° C. with a speed of 100 mm/minute. Tensile strength is calculated from the ratio of maximum force measured and initial cross section of the sample. Elongation at break is the quotient of the change in length relative to the starting length in percent.

Tensile shear strengths are determined on single-lap bonds to DIN EN 1465 by means of a tensile tester with a speed of 12 mm/minute at a temperature of 23+/−2° C. until the bond breaks. The polycarbonate substrates (PC) to be bonded are cleaned with isopropanol. In the case of the carbon fiber-reinforced plastic substrates based on an epoxy resin matrix (CFP) that are to be bonded, the peel ply is removed. There are no further pretreatments.

The adhesive thickness is 2 mm. The bonded area is 300 mm².

The bonds are stored at 20° C. and 65% relative humidity for 7 days until testing. In each case, the bond was broken in a cohesive manner.

In the determination of the handling strength, the time after the joining of the CFP substrates where the tensile shear strength is 0.3 MPa is determined.

The invention claimed is:

1. A two-pack polyurethane adhesive comprising a first pack A containing at least one polyester A1 which is solid at room temperature and at least one polyol A2 having a hydroxyl group functionality greater than 2.0, and a second pack B containing polyurethane prepolymers having isocyanate groups.

2. The two-pack polyurethane adhesive according to claim 1, wherein the polyesters A1 have a functionality of at least one hydroxyl end group.

3. The two pack polyurethane adhesive according to claim 1, wherein the glass transition temperature or the melting point of A1 is above 23° C.

4. The two-pack polyurethane adhesive according to claim 1, wherein the polyol A2 is selected from the group including polyethers, polyacrylates, polycarbonates or hydroxyl-terminated polyolefins or polyesters.

5. The two-pack polyurethane adhesive according to claim 1, wherein the polyol A2 comprises polyesters.

6. The two-pack polyurethane adhesive according to claim 1, wherein the polyurethane prepolymers having isocyanate groups consist of the reaction product of at least one polyol with an excess of polyisocyanates.

7. The two-pack polyurethane adhesive according to claim 6, wherein polyisocyanates used are di- or multifunctional, aromatic, aliphatic or cycloaliphatic isocyanates, and carbodiimide-modified isocyanates or isocyanate-terminated prepolymers.

8. A method for producing adhesive bonds based on the two-pack polyurethane adhesive of claim 1, comprising the separate melting of the A and B packs, depending on the melt viscosity, at temperatures above the melting points and/or glass transition points of all the constituents in the two packs, mixing of the two liquid packs A and B and subsequent application to the substrates to be bonded.

9. The method according to claim 8, wherein the two liquid packs A and B are mixed with one another in a mixing ratio between 1:9 and 9:1 percent by volume.

10. A two-pack polyurethane adhesive comprising a first pack A containing at least one polyester A1 which is solid at room temperature and at least one polyol A2 having a hydroxyl group functionality greater than 2.0 and additives, and a second pack B containing polyurethane prepolymers having isocyanate groups and additives.

11. The two-pack polyurethane adhesive according to claim 10, wherein the polyesters A1 have a functionality of at least one hydroxyl end group.

12. The two pack polyurethane adhesive according to claim 10, wherein the glass transition temperature or the melting point of A1 is above 23° C.

13. The two-pack polyurethane adhesive according to claim 10, wherein the polyol A2 is selected from the group including polyethers, polyacrylates, polycarbonates, hydroxyl-terminated polyolefins, or polyesters.

14. The two-pack polyurethane adhesive according to claim 10, wherein the polyol A2 comprises polyesters.

15. The two-pack polyurethane adhesive according to claim 10, wherein the polyurethane prepolymers having isocyanate groups consist of the reaction product of at least one polyol with an excess of polyisocyanates.

16. The two-pack polyurethane adhesive according to claim 15, wherein polyisocyanates used are di- or multifunctional, aromatic, aliphatic or cycloaliphatic isocyanates, and carbodiimide-modified isocyanates or isocyanate-terminated prepolymers.

17. The two-pack polyurethane adhesive according to claim 10, wherein the additives for pack A and/or B are selected from the group comprising fillers, rheology modifiers, pigments or dyes, nonfunctionalized polymers, flame retardants, tackifiers, waxes, plasticizers, desiccants, adhesion promoters, fibers, latent hardeners, hydrolysis stabilizers, and ageing stabilizers and auxiliaries.

18. A method for producing adhesive bonds based on the two-pack polyurethane adhesive of claim 10, comprising the separate melting of the A and B packs, depending on the melt viscosity, at temperatures above the melting points and/or glass transition points of all the constituents in the two packs, mixing of the two liquid packs A and B and subsequent application to the substrates to be bonded.

19. The two pack polyurethane adhesive according to claim 11, wherein the glass transition temperature or the melting point of A1 is above 23° C.

20. The two-pack polyurethane adhesive according to claim 11, wherein the polyol A2 is selected from the group including polyethers, polyacrylates, polycarbonates or hydroxyl-terminated polyolefins or polyesters.

* * * * *